United States Patent [19]

Guest et al.

[11] 4,451,886

[45] May 29, 1984

[54] BUS EXTENDER CIRCUITRY FOR DATA TRANSMISSION

[75] Inventors: David H. Guest, Balerno; Peter R. Roubaud, Kirkliston, both of Scotland

[73] Assignee: Hewlett-Packard Limited, South Queensferry, Scotland

[21] Appl. No.: 498,038

[22] Filed: May 26, 1983

Related U.S. Application Data

[63] Continuation of Ser. No. 258,219, Apr. 27, 1981, abandoned.

[30] Foreign Application Priority Data

Apr. 30, 1980 [GB] United Kingdom ............... 8014288

[51] Int. Cl.³ .............................................. G06F 3/00
[52] U.S. Cl. .................................. 364/200; 364/900; 340/825.07
[58] Field of Search .............................. 364/200, 900; 340/825.21, 825.14, 825.07; 178/3, 4

[56] References Cited

U.S. PATENT DOCUMENTS

| Re. 29,246 | 5/1977 | Ricci | 364/900 |
| 3,878,512 | 4/1975 | Kobayashi et al. | 340/825.07 |
| 3,990,046 | 11/1976 | Katz et al. | 340/825.07 |
| 4,064,360 | 12/1977 | Koenig | 178/3 |
| 4,156,796 | 5/1979 | O'Neal et al. | 364/900 |
| 4,223,380 | 9/1980 | Antonaccio et al. | 364/200 |

OTHER PUBLICATIONS

Guest, David H., "An HP-IB Extender for Distributed Instrument Systems," Hewlett-Packard Journal, Aug., 1979, pp. 26-32.

Primary Examiner—Gareth D. Shaw
Assistant Examiner—D. Rutherford
Attorney, Agent, or Firm—Douglas A. Kundrat

[57] ABSTRACT

The present invention is related to bus extender circuitry for data transmission from a first bus at a first site to a second bus at a second site, includes a first transceiver at the first site, a second transceiver at the second site and a data and control signals transmission medium interconnecting both transceivers. The first transceiver receives data signals and interacts by means of control signals with the first bus which has data and control lines connected to a data source and possibly also to one or more receivers all located at the first site. The second transceiver receives data signals and interacts, by means of control signals, with the first transceiver to transmit data and control signals to the second bus; the second transceiver has data and control lines connected to one or more receivers at the second site.

12 Claims, 13 Drawing Figures

| State No. | Outputs | | |
|---|---|---|---|
| | rnb | NRFD1 | NDAC1 |
| 1 | F | T | T |
| 2 | F | F | T |
| 3 | T | T | F |
| 4 | F | T | F |

| State No. | Outputs | |
|---|---|---|
| | rnb | DAV2 |
| 5 | T | F |
| 6 | T | F |
| 7 | T | T |
| 8 | F | F |

BUS EXTENDER CIRCUITRY FOR DATA TRANSMISSION

CROSS REFERENCE TO RELATED APPLICATION

This is a continuation of application Ser. No. 258,219, filed Apr. 27, 1981, now abandoned.

BACKGROUND OF THE INVENTION

The IEEE Standard 488-1978 (versions which have been adopted by various standards organizations) describes a method commonly used for interconnecting a number of devices such as measuring instruments, process monitoring and control devices, and computers so that they may all operate together as a system. Systems of this type are disclosed in U.S. Pat. No. Re. 29,246. All devices are interconnected by a bus comprising data lines for bit-parallel, byte-serial data transmission, and control lines. A main feature of IEEE Standard 488-1978 is a byte transfer handshake sequence in which a data source transmits new data signals to one or more receivers only upon the completion of a sequence of control signals. A first control signal, transmitted by each receiver, indicates to the data source that all prior data has been received. A third control signal, transmitted by each receiver, indicates to the data source that each receiver is ready to receive new data. Finally, after a specified stabilization delay has elapsed since receipt of the third control signal, the data source transmits a second control signal to each receiver to indicate that valid data is to follow. Of course, there are still other control signals, but these are not relevant for understanding the present invention.

One limitation of this standard bus system is that all devices connected to it on the common bus conductors must be within a distance of 20 meters of each other, and usually very much closer. Because of the need to have some or many of the devices distributed over remote locations, and yet still enjoying the benefits of a standard system of connection and communication, several extender circuitries have been developed to allow bus-compatible devices to be controlled at remote locations. An important requirement of any such extender circuitry is that its operation should be as transparent as feasible to all the possible sequences of operation that are permitted by the standard in complex systems of devices. By "transparent" it is meant that the existence of the extender circuitry between a local sub-system and a remote sub-system should not change the functional bus operation of the system. The program of operations contained within the controller device should not require special features to accomodate the presence of the extender circuitry, and neither should different characteristics be required of other devices connected to the bus. Any such modifications would significantly detract from the universal compatibility which the standard aims to achieve, and would require the bus programmer and user to have non-standard specialist knowledge.

An example of extender circuitry according to the prior art is described "Hewlett-Packard Journal", August 1979, pp. 26–32. This extender circuitry is capable of connecting a local bus and a remote bus, both according to the above mentioned standard. In relatively simple system configurations it is substantially transparent, and additional systems programming is unnecessary. In extender circuitry such as this, however, the problem of "transit storage" arises in that, at certain times, one or more of the bytes being transferred is held in temporary storage within the extender circuitry only.

This occurs because the extender connected to the byte source performs a first complete handshake with the source in order to accept a byte, the byte is then transmitted by some method to the other extender, and it then performs a second independent handshake to pass the byte to any acceptor at its end. Sometimes several bytes are transferred to the extender at one end before the first byte is transferred from the extender at the far end, and consequently several bytes are held only in transit storage. Dependent on the nature of devices connected to the two sub-buses and on the system program, and particularly when a new talker is assigned, it is possible for an indeterminate (in the general case) number of bytes to be left in transit storage. With each case in which this can occur, the extender pair must mutually recognize the occurrence and decide what to do with the stored bytes. To give a high degree of transparency under all such circumstances the extenders must implement very complex algorithms and be designed in a manner which is relatively costly to manufacture.

SUMMARY OF THE INVENTION

In accordance with the illustrated preferred embodiment of the present invention, a bus extender circuit is substantially transparent to data passing between a data source and a data acceptor. Two handshake devices (transmitting and receiving) are connected by a transmission medium. The transmitting handshake device is connected to the data source by a first data and control bus and the receiving handshake device is connected to the data acceptor by a second data and control bus. The bus extender circuit may be utilized in a system having a plurality of data sources and acceptors and wherein individual sources and acceptors simultaneously function as both sources and acceptors.

The data acceptor indicates to the receiving handshake device that all previous data has been accepted and that the data acceptor is ready to receive new data. The receiving handshake device then indicates to the transmitting handshake device, via an rnb signal, that a new byte of data may be transmitted between the two handshake devices. The transmitting handshake device indicates to the data source that the previous data has been accepted and that the data acceptor is ready to accept new data. The data source then places new data on the bus and indicates to the transmitting handshake device that valid data has been placed on the bus and the transmitting handshake device instructs the receiving handshake device, via a tnb signal, to take the next byte of data.

The bus extender circuit which is constructed in accordance with the illustrated preferred embodiment of the present invention ensures that there is no storage of data bytes between the data source and the data acceptor. Both handshake devices are substantially transparent in both directions of data transmission.

DESCRIPTION OF THE PREFERRED EMBODIMENT

The illustrated preferred embodiment of the present invention will now be described, by way of example, with reference to the accompanying drawings and with respect to the following Table 1.

tors. When line 13 is true (low) NRFD (Not Ready for Data) on line 13 indicates that at least one of the acceptors is not yet ready for the next byte. When line 15 is true (low) NDAC (Not Data Accepted) on line 15 indicates that at least one of the acceptors has not yet accepted the current byte. A listing of the signals relevant in connection with the preferred embodiment of the present invention, their names, mnemonics, logic states and electrical signal levels is given in Table 1.

Figure 2:
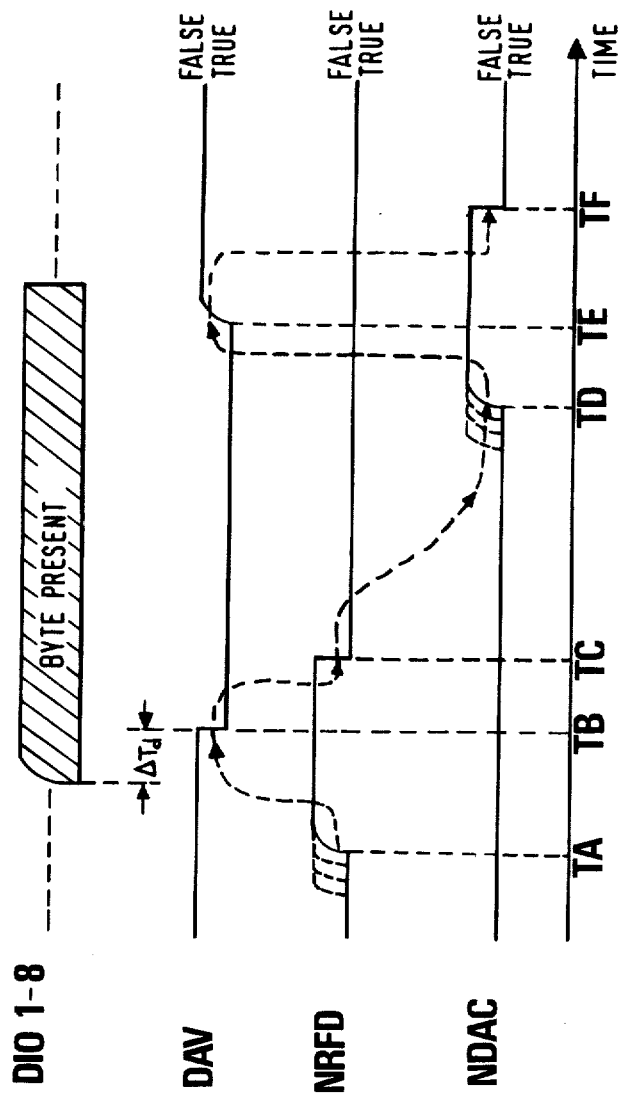
FIG. 2 is a time sequence diagram of the handshake signals occurring in the circuit according to FIG. 1.

In a typical sequence of operations, per FIG. 2, NRFD goes false at transition TA indicating that all acceptors (especially the "latest" acceptor) are ready for any byte that the source may have. This allows the source to put DAV true to indicate that the DI0 lines 1 to 8 are now validly carrying the source's byte (transition TB) provided that a time delay $\Delta T_d$ (e.g. 2 μs) has elapsed after the source has switched the byte onto the bus lines DI0 1 to 8. Also, the acceptors are enabled for receiving data. One acceptor (the "earliest") then puts NRFD true to indicate that it is no longer ready (transition TC), and the other acceptors follow at their own rates. Transition TD indicates that all acceptors have accepted the byte. Having seen that all acceptors now have the data, the source puts DAV false to indicate that the DI0 lines must not now be considered valid (transition TE). Sensing that DAV is now false, one acceptor then puts NDAC true (transition TF) ready for the next byte transfer, and the other acceptors follow at their own rates. Fuller details of the operation may be found in the state diagrams and description of IEEE Standard 488-1978 or corresponding documents.

Figure 3:
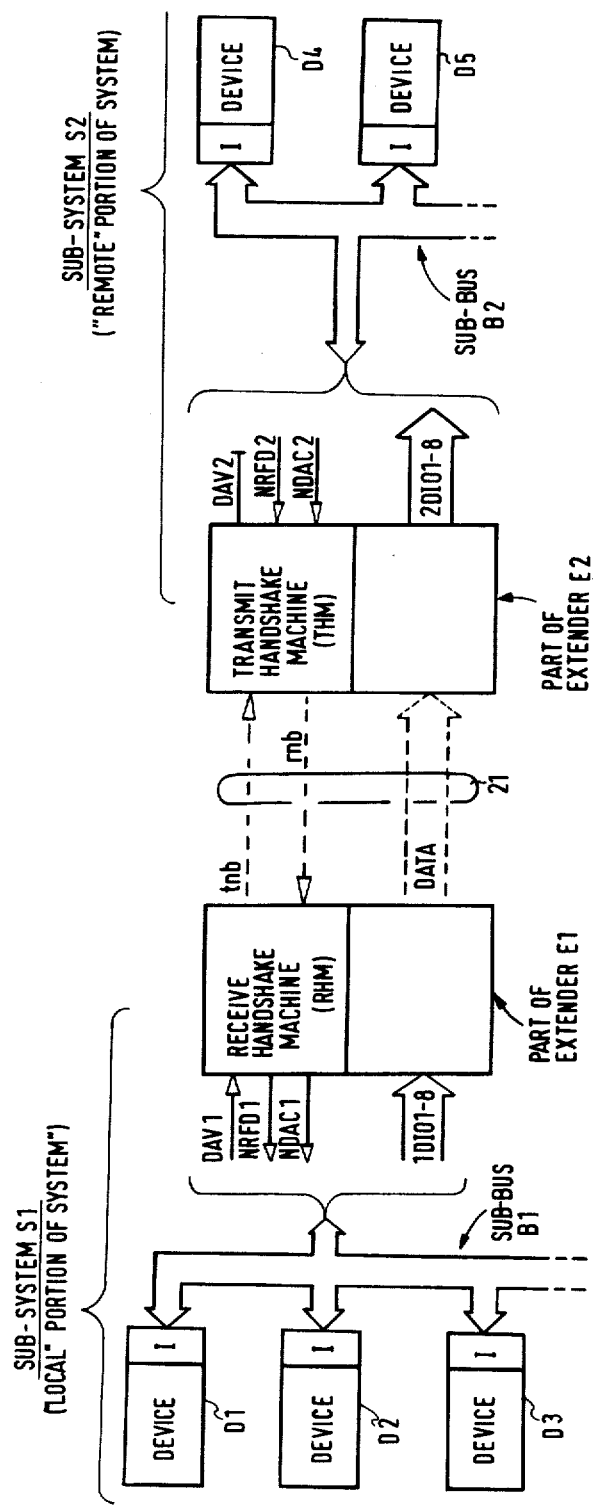
FIG. 3 is a block diagram of the preferred embodiment of the present invention, schematically illustrating a handshake extension system for the interconnection according to FIG. 1.

FIG. 3 shows two handshake extension units, E1 and E2, which are constructed according to the preferred embodiment of the present invention, being used to connect a local subsystem S1 (having an interface sub-bus B1) to a remote sub-system S2 (having an interface sub-bus B2).

TABLE 1

| | | Signal Definitions | |
|---|---|---|---|
| (a) Signal<br>(b) Inverted Signal | Mnemonics<br>( ‾ means inverted) | Logic State<br>T = True (Affirmative)<br>F = False (Non-Affirmative) | Electrical Signal Level |
| (a) Data Valid | DAV | T | Low |
| (b) Data not Valid | $\overline{\text{DAV}}$ | F | High |
| (a) Not Ready for Data | NRFD | T | Low |
| (b) Ready for Data | $\overline{\text{NRFD}}$ | F | High |
| (a) Not Data Accepted | NDAC | T | Low |
| (b) Data Accepted | $\overline{\text{NDAC}}$ | F | High |
| (a) Take New Byte | tnb | T | High |
| (b) Don't Take New Byte | $\overline{\text{tnb}}$ | F | Low |
| (a) Ready for New Byte | rnb | T | High |
| (b) Not Ready for New Byte | $\overline{\text{rnb}}$ | F | Low |

Figure 1:
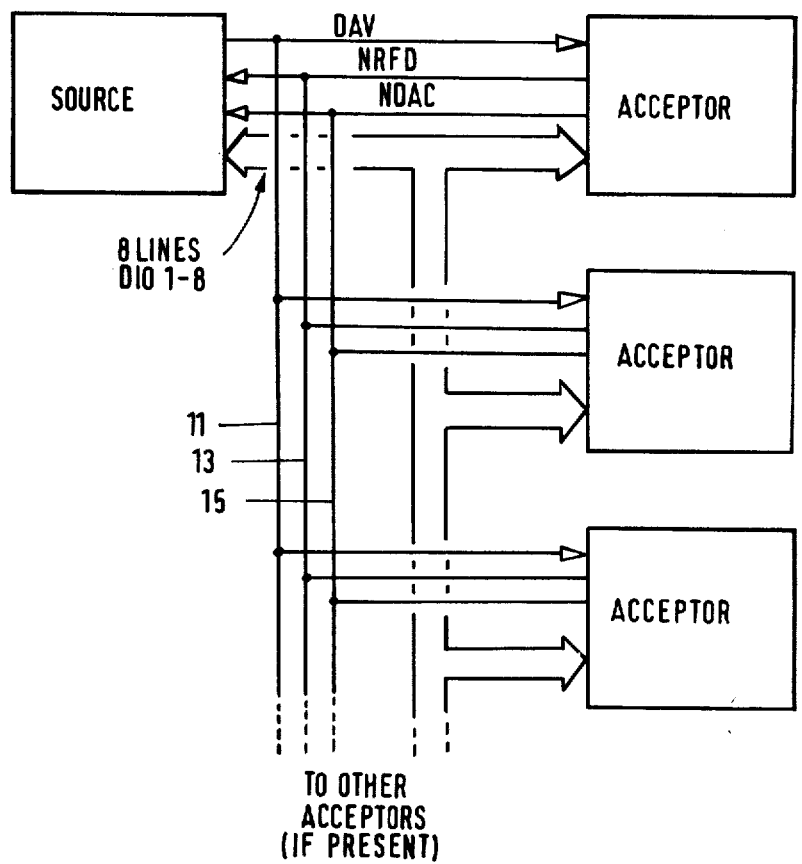
FIG. 1 is a block diagram schematically illustrating the byte and handshake interconnections according to IEEE-Standard 488-1978 which is known in the prior art.

FIG. 1 shows the prior art standard interface bus system, the operation of which is briefly discussed here for the purpose of better illustrating the preferred embodiment of the present invention.

The transfer of data or command bytes, on the eight lines DI01 to DI08 of the standard, between a source device and one or more acceptor devices is controlled by means of three handshake lines 11, 13 and 15. Other bus lines such as managing lines are not shown. FIG. 2 shows the sequence of operations involved in transferring one byte from one source to several acceptors as described in the standard. When line 11 is driven logically true (electrically low level) by the source, line 11 (DAV, Data Valid) indicates that the data on the DI0 lines is valid and may be correctly read by the acceptors.

To each sub-bus a number of devices are connected via a standard interface indicated by I. The term "device" is used here as a collective term for any instrument, controller, computer etc. compatible with the standard interface bus. In FIG. 3 devices D1 to D3 are shown to be connected to sub-bus B1, and devices D4 and D5 are shown to be connected to sub-bus B2. Essential communication paths are shown for a situation in which a device (e.g. D1) on sub-bus B1 is sourcing bytes and devices on both sub-buses (but particularly sub-bus B2) are accepting. In practice, of course, the extender pair has the ability to pass bytes in the reverse direction as well, but for simplicity of explanation only the communication paths necessary for a single direction are shown. The communication paths for the reverse direction are fully identical to those for the direction shown.

DAV1, NRFD1 and NDAC1 are the standard bus signals by which extender E1 communicates with the source (and possibly acceptors) on sub-bus B1, and 1DIO1-8 are the eight data signals from the source. Similarly, DAV2, NRFD2 and NDAC2 are the standard bus signals by which extender E2 communicates with one or more acceptors on sub-bus B2, and 2DIO1-8 are the eight data signals to the acceptors on that sub-bus. (In fact, the extenders will continue to operate with no acceptors connected, but this is a trivial case and of no practical value.) Other standard bus lines are not shown because they are not essential to this discussion. To each sub-bus, the corresponding extenders have a functional interface behavior which is looks indistinguishable (to the other devices) from a standard bus interface. Bytes are transferred between sub-buses substantially transparently and effectively with no transit storage from a system point of view, as will be shown later.

In operation the extenders E1 and E2 must be considered as a pair, but for explanatory purposes it is convenient to divide the handshake interaction into two parts as shown in FIG. 3. In a typical implementation, two parts of a logic state machine for the handshake signals reside in the two extenders, one connected to each of the two sub-buses. The part connected to sub-bus B1 (which also has the source connected to it) will be called the Receive Handshake Machine (RHM), and the part connected to sub-bus B2 (which in general will have acceptors connected) will be called the Transmit Handshake Machine (THM). There may also be other acceptors on sub-bus B1. Between the extenders runs a data communication medium 21, whose precise nature is immaterial to the invention, which carries logic state information between the extenders. In this typical implementation medium 21 carries at least logical variables tnb (take new byte) from the RHM to the THM, rnb (ready for next byte) from the THM to the RHM and data representative of the eight data signals.

Figure 4:
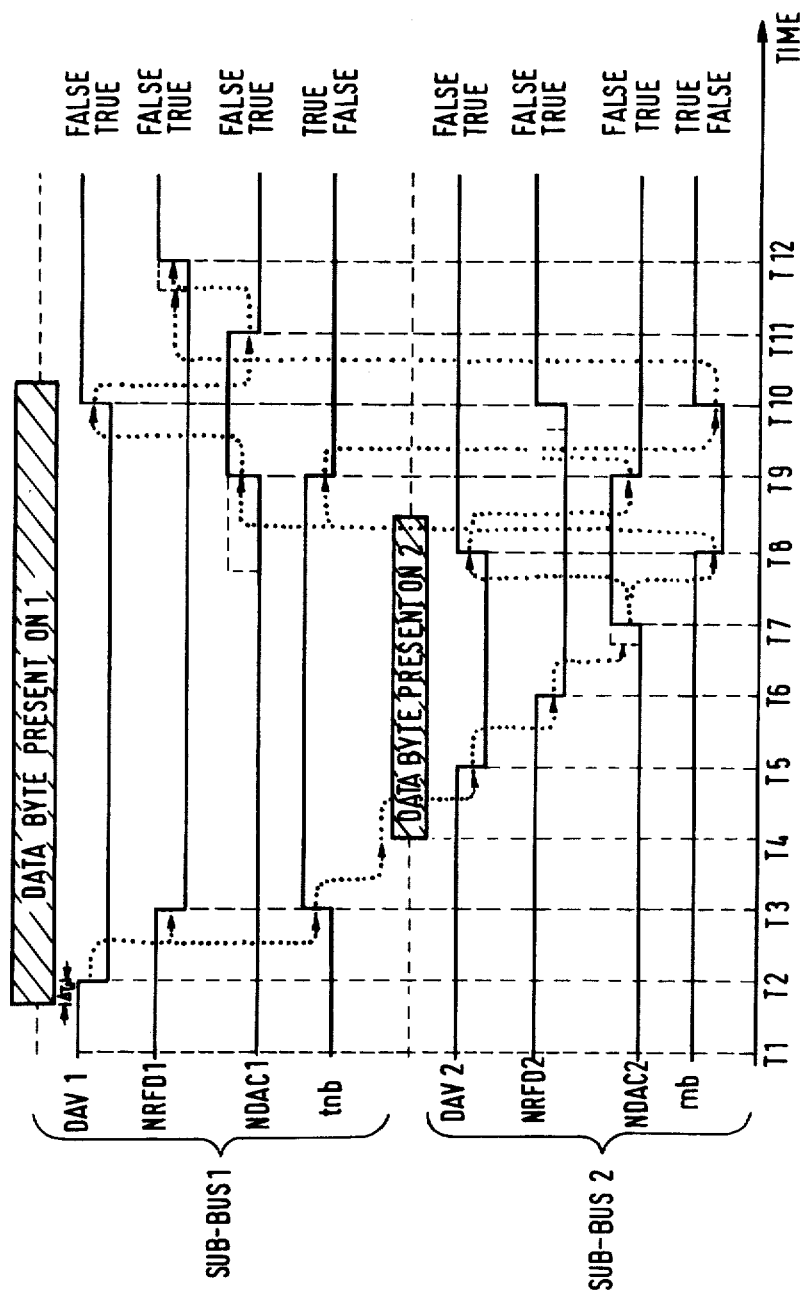
FIG. 4 is a time sequence diagram of the circuit according to FIG. 3.

FIG. 4 shows, in a manner similar to FIG. 2, a typical sequence of sub-bus events by which the two extenders participate and bytes are transferred without transit storage. Internal communication logical variables tnb and rnb provide a convenient way of linking the operation of the RHM and the THM, but which are not the only way of providing the necessary communication of importance is the order of events occurring on the three handshake lines on each of the two sub-buses.

When a number of data bytes are transferred, the sequence of FIG. 4. will occur repeatedly. For one cycle the RHM (which has the current sourcing device connected to its sub-bus B1) responds to DAV1 and drives NRFD1 and NDAC1. Other devices on sub-bus B1 may also respond to DAV1 and drive NRFD1 and NDAC1. The THM drives DAV2 and responds to NRFD2 and NDAC2 on sub-bus B2. In general, several devices on sub-bus B2 respond to DAV2 and drive NRFD2 and NDAC2 (although in the trivial case the system will work with no other devices on sub-bus B2). The logic states, electrical signal levels, and tnb and rnb are defined in Table 1.

The transition times T1 to T12 shown in FIG. 4 are for reference only to indicate the order in which events occur. The time intervals will not in reality be uniform. Two transitions shown at the same time may not necessarily be coincident, although both will in general be dependent on a transition at the previous time. FIG. 4 can only depict one typical sequence of events, but in a practical situation there will be minor variations depending on the nature and relative speeds of the extenders and devices. A typical sequence, per FIG. 4, is as follows:

T1:
 This will be considered as the start of the sequence although it need not necessarily be. NRFD1 and NRFD2 are false, NDAC1 and NDAC2 are true, indicating that all devices are ready for data including the RHM. rnb is true because the THM is indicating to the RHM that it is ready to put out a new byte on sub-bus B2 if required.

T2:
 The present source (on sub-bus B1) puts DAV1 true as it begins its part of the cycle for transferring a byte and after a delay $\Delta Td$ has elapsed as mentioned above in connection with FIG. 2.

T3:
 The RHM and any acceptors on sub-bus B1 put NRFD1 true to indicate that they are no longer ready for data. tnb is also set true, at a similar time, as a message to the THM that the accompanying byte information is valid and therefore the handshake on sub-bus B2 can proceed.

T4:
 tnb message arrives at the THM. If it arrives coincident with the new byte, then a delay is desirable before putting DAV2 true in order to be sure that the eight data signals 2DIO1-8 have settled.

T5:
 A suitable delay has elapsed since T4 if necessary. Provided NRFD2 is false, indicating that all acceptors on sub-bus B2 are ready for another byte, then DAV2 may be put true by the THM. If NRFD2 is not yet false then DAV2 must wait until it is, before going true.

T6:
 Acceptors on sub-bus B2 respond to DAV2 going true by putting NRFD2 true.

T7:
 When the last acceptor on sub-bus B2 has indicated that it has read the byte, NDAC2 goes false to tell the THM that the byte has been read.

T8:
 The THM puts DAV2 false since the byte data is no longer needed on sub-bus B2. At a similar time rnb is set false as a message to the RHM that all acceptors now have the byte data.

T9:
 In response to rnb going false, the RHM can put NDAC1 false since all acceptors on sub-bus B2 have the data. NDAC1 will not actually become false until all the acceptors on sub-bus B1 have also set NDAC1 false to indicate that they too have the byte data.

At a similar time, tnb is set false as a message to the THM that rnb may be set true ready for the next cycle. This message might be omitted if a communication method is adopted which does not require rnb to be returned to its initial state, as would be the case if discrete messages were sent instead of logic levels.

At a similar time, the acceptors on sub-bus B2 put NDAC2 true in response to DAV2 going false.

T10:
  rnb goes true ready for the next cycle. Depending on the communication method used, this message might be omitted (see above). At a similar time, NRFD2 goes false as the last acceptor on sub-bus B2 indicates that it is ready for more data.
  At a similar time, DAV1 goes false, in response to NDAC1 going false, since the byte data is no longer needed.

T11:
  The acceptors on sub-bus B1 (and also the RHM) put NDAC1 true in response to DAV1 going false.

T12:
  The acceptors on sub-bus B1 (and also the RHM) put NRFD1 false to indicate they are all ready for new data.
  The cycle has now completed and all states are the same as at the starting time T1.

It readily will be appreciated from FIG. 4 and the foregoing explanation that the sequence of events presented by the RHM to the source on sub-bus B1 is substantially the same as if the two sub-buses were connected together without extenders. The same can be said about the sequence of events presented by the THM to the acceptors on sub-bus B2. In both cases, the events occur in substantially the same order as perceived by any device, with and without extenders, even if the time between adjacent events is slightly different. By the nature of devices designed to the standard, such time differences are of no consequence to the interface operation.

By means of a pair of handshake machines RHM and THM linked together as described, there is effectively no transit storage when bytes are passed between the separate sub-buses B1 and B2, which is important for reasons already shown. It can be seen that a first message from the RHM on sub-bus B1 is sent to the THM on sub-bus B2 to tell it that new byte data is available for transmitting to acceptors on sub-bus B2. It can also be seen that a second message is sent from the THM to the RHM to tell it that all acceptors on the sub-bus B2 have captured the byte data and that the RHM may indicate to the source that the transfer is complete.

The RHM and THM shown in FIG. 3, which participate in the typical sequence of events shown in FIG. 4, may be implemented in a variety of ways as logic state machines.

Figure 5:
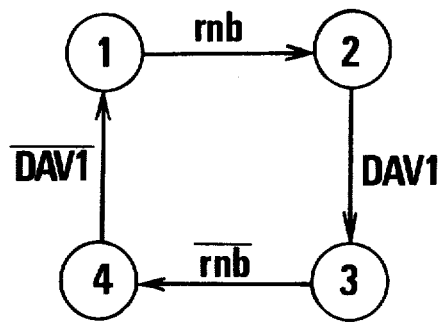
FIG. 5 is a logic state diagram and its associated output state table of the receive handshake machine included in FIG. 3.

FIG. 5 shows a four state logic diagram which may be implemented as the RHM. The RHM changes state as shown, in response to the true values of the functions of the input variables indicated adjacent to each relevant arrow. The associated table shows the logical values of the three output variables from the RHM, for each of the four states.

Figure 6:
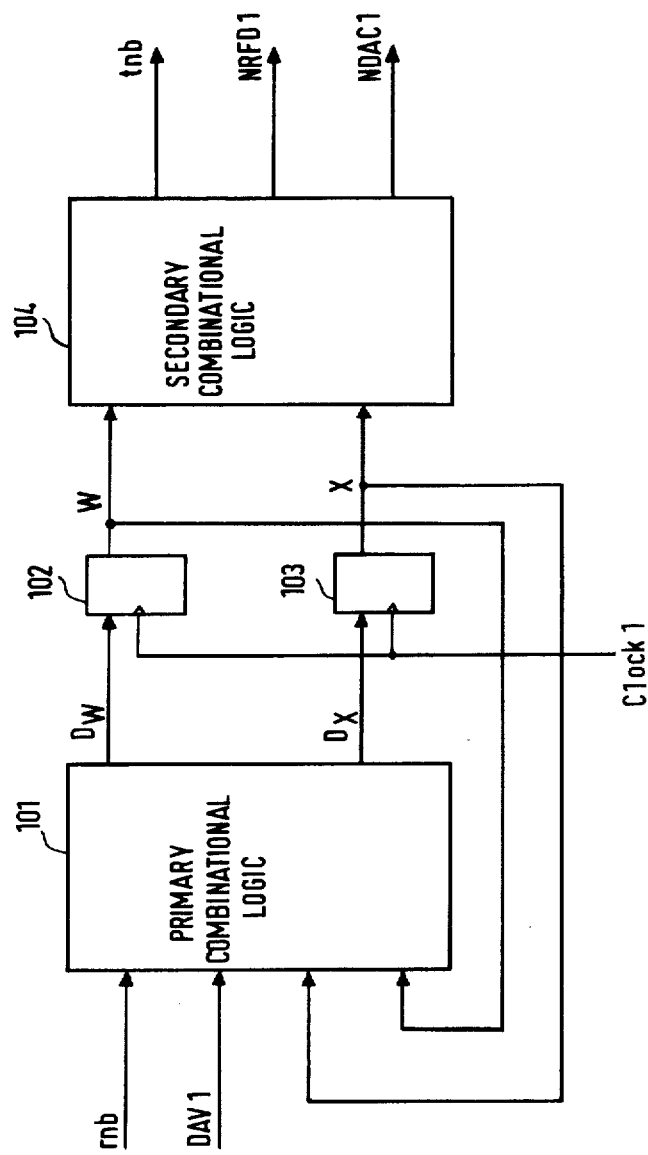
FIG. 6 is a detailed block diagram of the receive handshake machine included in FIG. 3.
Figure 6A:
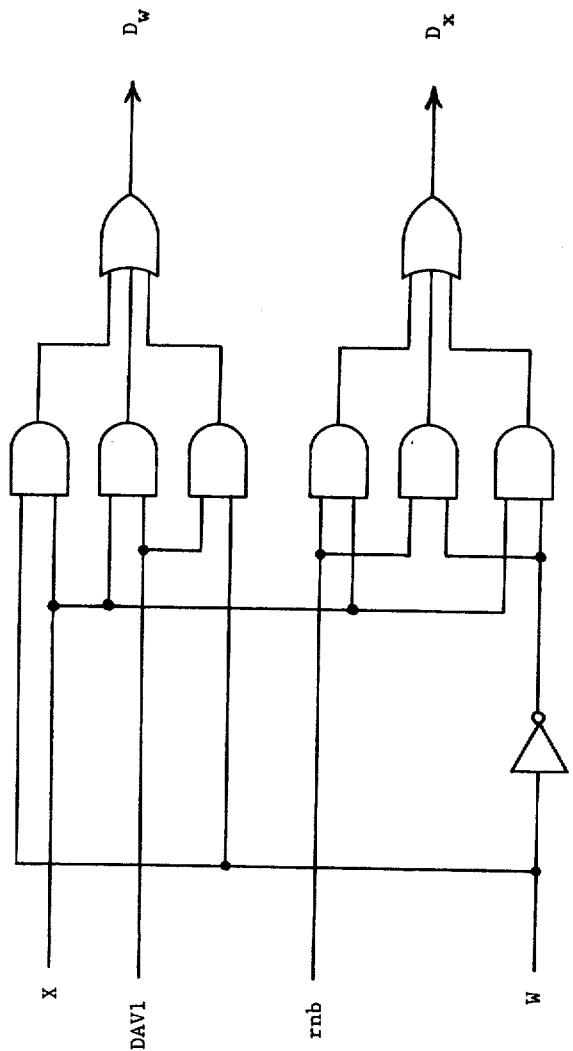
FIGS. 6A, 6B are circuit diagrams of combinational logic circuits of the receive handshake machine shown in FIG. 6.

FIG. 6 shows one possible machine structure for implementing the RHM described by FIG. 5. Flip-flops 102 and 103 are D-type flip-flops of conventional characteristics, whose outputs are variables W and X respectively, and whose data inputs are $D_w$ and $D_x$ respectively. The flip-flops 102 and 103 are clocked by CLOCK 1 which is of arbitrary frequency but usually will be sufficiently high in frequency to ensure adequate speed of machine operation. A primary combinational logic circuit 101 (see FIG. 6A) provides outputs $D_w$ and $D_x$ as boolean logical functions of machine input signals rnb and DAV1, and of variables W and X. These functions are given by expression (1) and expression (2) below, where the symbols $\wedge$ and $\vee$ represent the logical operations AND and OR respectively, and where a bar over a variable represents its logical inversion. The AND operator takes precedence over the OR operator unless otherwise indicated.

$$D_w = W \wedge \quad X \vee \quad DAV1 \wedge \quad X \vee \quad DAV1 \wedge \quad W \tag{1}$$

$$D_x = \overline{W} \wedge \quad X \vee \quad rnb \wedge \quad \overline{W} \vee \quad rnb \wedge \quad X \tag{2}$$

Figure 6B:
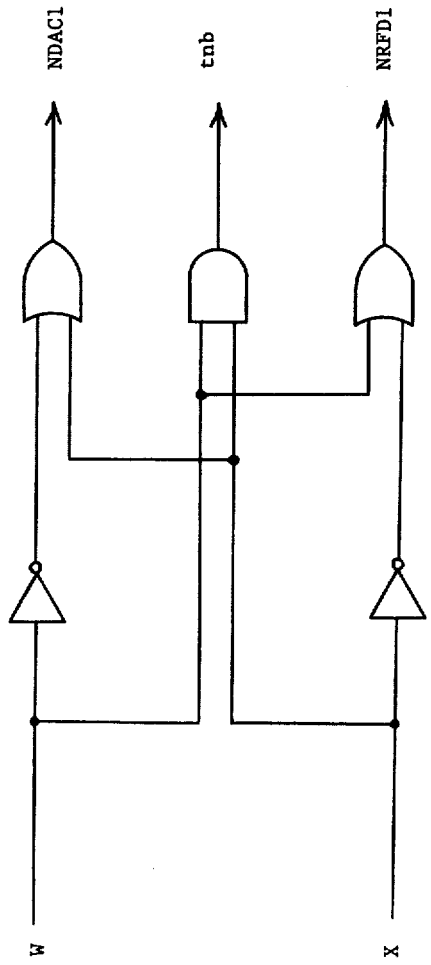

A secondary combination logic circuit 104 provides machine outputs (see also FIG. 6B) tnb, NRFD1 and NDAC1 as functions of variables W and X. These functions are given by expressions (3), (4) and (5) below.

$$tnb = W \wedge \quad X \tag{3}$$

$$NRFD1 = W \vee \quad \overline{X} \tag{4}$$

$$NDAC1 = \overline{W} \vee \quad X \tag{5}$$

Figure 7:
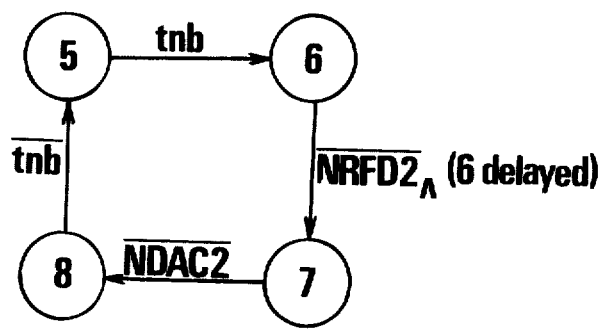
FIG. 7 is a logic state diagram and its associated output state table of the transmit handshake machine included in FIG. 3.

FIG. 7 shows a four state logic diagram which may be implemented as the THM. The THM changes state as shown, in response to the true values of the functions of the variables indicated adjacent to each relevant arrow. The transition from state 6 to state 7 should only take place when both NRFD2 is false and the machine has been in state 6 for a minimum period of time. This minimum period of time, which typically can be 2 $\mu s$, is necessary to ensure that DAV2 is not asserted true by state 7 before the byte signals 2DI01-8 have settled to their new states. This minimum period may be disregarded if it can be assured for other reasons that the byte is present in data signals 2 DI01-8 sufficiently before DAV2 becomes true, as, for example, if the byte arrives from extender E1 some time before tnb. The associated table shows the logical values of the two output variables from the RHM, for each of the four states.

Figure 8:
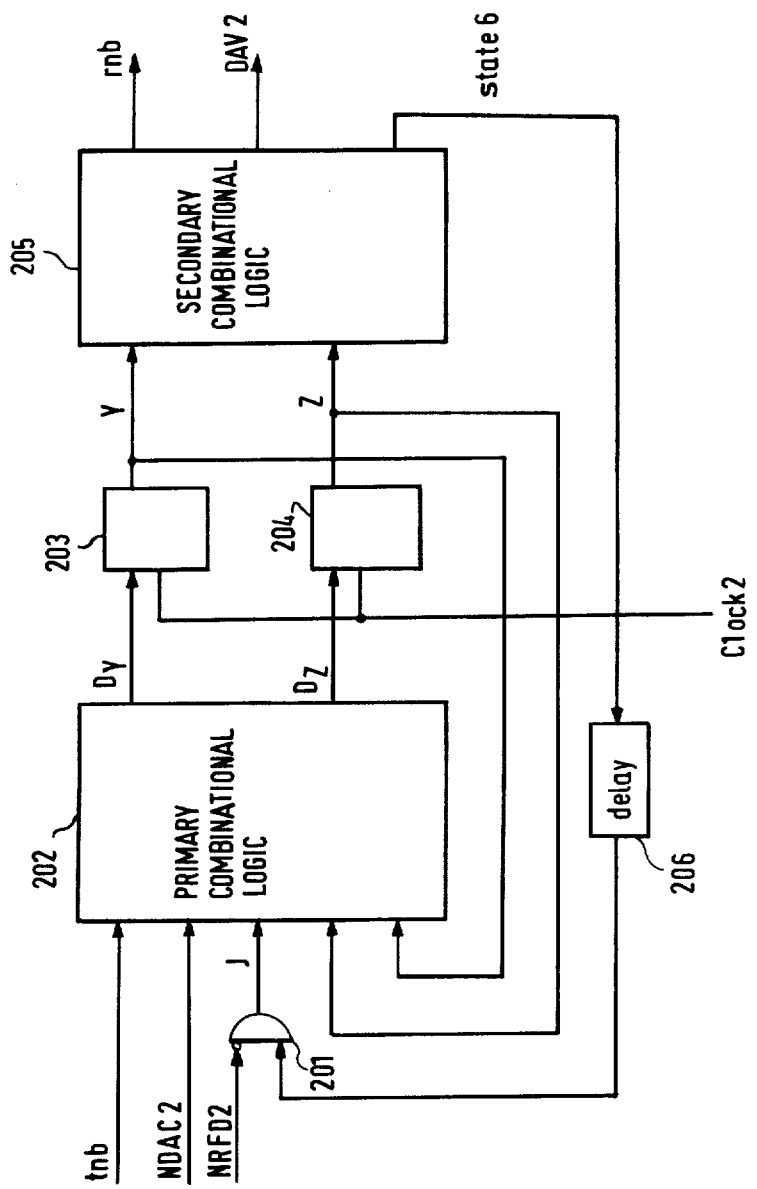
FIG. 8 is a detailed block diagram of the transmit handshake machine included in FIG. 3.
Figure 8A:
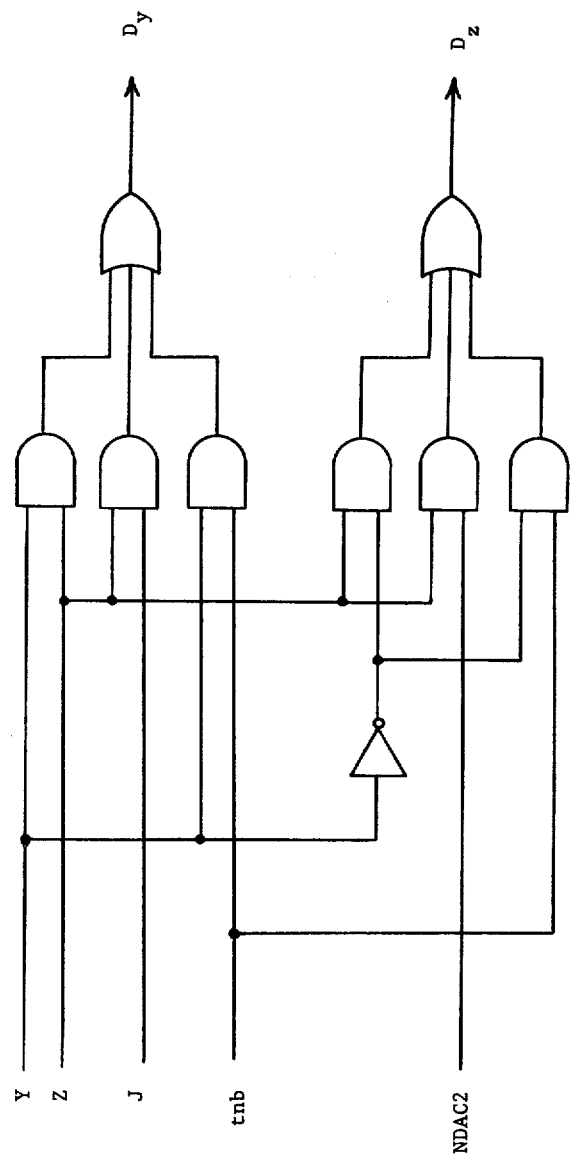
FIGS. 8A, 8B are circuit diagrams of combinational logic circuits of the transmit handshake machine shown in FIG. 8.

FIG. 8 shows one possible machine structure for implementing the THM described by FIG. 7. Flip-flops 203 and 204 are D-type flip-flops whose outputs are Y and Z respectively, and whose data inputs are $D_y$ and $D_z$ respectively. The flip-flops 203 and 204 are clocked by CLOCK 2 which is of arbitrary frequency but usually will be sufficiently high in frequency to ensure adequate speed of machine operation. A primary combinational logic circuit 202 provides outputs $D_y$ and $D_z$ as functions of machine inputs tnb and NDAC2, and variables J, Y and Z (see FIG. 8A). Variable J comes from an AND-Gate 201 the inputs of which are $\overline{NRFD2}$ and a variable which becomes true after the machine enters state 6, but following a delay (as previously discussed) provided by a delay means 206. J is given by expression (6) below.

$$J = \overline{NRFD2} \quad \text{(state-6-delayed)} \tag{6}$$

$D_y$ is given by expression (7) below, and $D_z$ by expression (8) below.

$$D_y = Y \wedge \quad Z \vee \quad Z \wedge \quad J \vee \quad Y \wedge \quad tnb \tag{7}$$

$$D_z = \overline{Y} \wedge \quad Z \vee \quad NDAC2 \vee \quad \overline{Y} \wedge \quad tnb \tag{8}$$

Figure 8B:
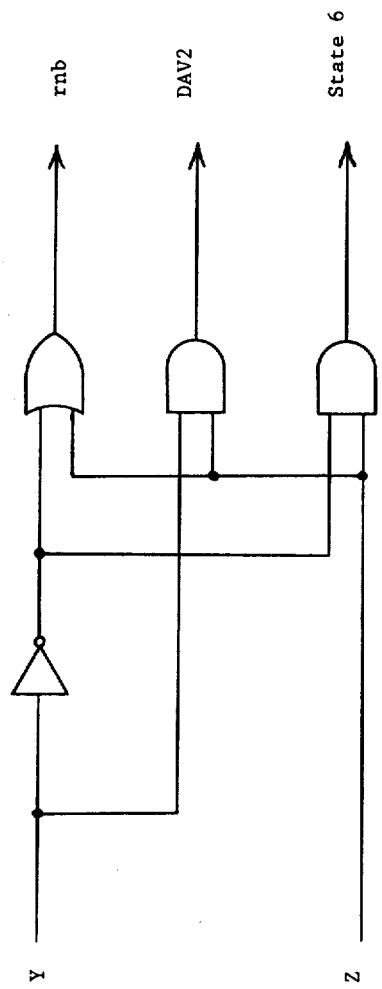

A secondary combinational logic circuit 205 provides machine outputs rnb and DAV2 and an output which becomes true during state 6 (see FIG. 8B). These outputs are functions of Y and Z, and are given by expressions (9), (10) and (11) below.

$$rnb = \bar{Y} \vee Z \tag{9}$$

$$DAV2 = Y \wedge Z \tag{10}$$

$$\text{State } 6 = \bar{Y} \wedge Z \tag{11}$$

Figure 9:
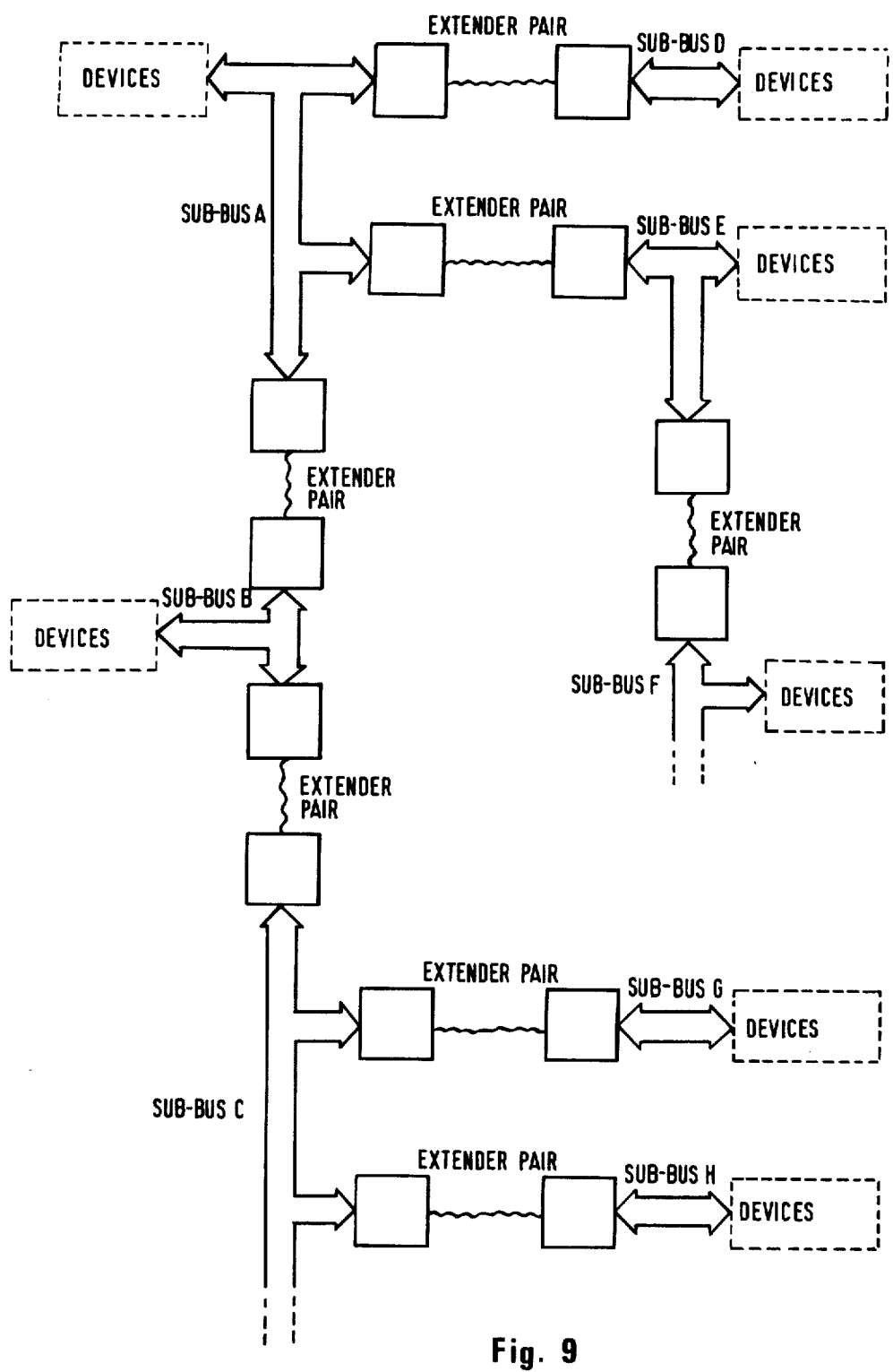
FIG. 9 is a block diagram showing how a substantially arbitrary number of bus extender pairs using the handshake extension system of FIG. 3 may be combined to a substantially arbitrary structure of sub-buses.

It is evident that since the bus handshake can be extended to a second cluster of devices on a remote sub-bus using a pair of extenders as described, it can also be extended simultaneously to any number of additional clusters of devices by means of additional pairs of extenders. In FIG. 9 sub-bus A together with sub-buses D, E and B comprise a system of pairs of extenders in a typical star configuration, while sub-buses A, E and F together are a tandem configuration. Arbitrary combinations of star and tandem configurations are possible as shown in FIG. 9. Whichever of these arrangements is used in the system, the principle expands automatically for these additional clusters of devices without any change being required in their design. Thus, the handshake on the sub-bus to which the source device is connected will not be completed until the handshake on all other sub-buses has been completed.

The illustrated preferred embodiment of the present invention has been described mainly in terms of two sub-buses which are remote from each other in order to provide an extended distance between bus-compatible devices. There are, however, other advantages to be gained by dividing a bus system into two or more sub-buses, even if the sub-buses may be physically close together.

According to the interface method described in IEEE Standard 488, the maximum number of devices which may be connected together in a single prior art system is 15. Using an extender pair as disclosed, a total of 28 devices effectively may participate in the handshake. With many extender pairs an unlimited number of devices may be interconnected, although a practical limit will be the number of possible device addresses available. In such an application, the term "extender pair" may not inappropriate since it may be convenient to merge bioth interfaces and handshake machines into a single unit.

A further advantage which may be achieved with extender pairs is that the signal or chassis ground potentials at which the devices on the two sub-buses operate need not be the same. If they are different then a data communication method must be adopted between extenders which does not require a direct metallic connection. Transformer coupling, optical isolators or optical fibers, for example, may be used.

We claim:

1. An extender circuit for transmitting a byte of data across a distance between a first sub-bus and a second sub-bus, the extender circuit comprising:
   first handshake means coupled to the first sub-bus;
   second handshake means, coupled to the first handshake means and to the second sub-bus, for determining that the second sub-bus is ready for the byte of data and for so indicating to the first handshake means;
   transmission means for carrying the byte of data across the distance;
   first data means, coupled to the first handshake means and controlled thereby, for selectably coupling the first sub-bus to the transmission means;
   second data means, coupled to the second handshake means and controlled thereby, for selectably coupling the second sub-bus to the transmission means;
   wherein the first handshake means is operative for receiving an indication from the second handshake means that the second sub-bus is ready for the byte of data, for indicating to the first sub-bus that the second sub-bus is ready for the byte of data, for determining that the byte of data is present on the first sub-bus and, responsive to said reception and determination, for causing the first data means to couple the first sub-bus to the transmission means and for thereafter indicating to the second handshake means that the byte of data is present on the transmission means; and
   wherein the second handshake means is further operative for receiving an indication from the first handshake means that the byte of data is present on the transmission means and, responsive thereto, for causing the second data means to couple the transmission means to the second sub-bus and thereafter for indicating to the second sub-bus that the byte of data is present on the transmission means.

2. An extender circuit as in claim 1, wherein the distance is greater than twenty meters.

3. An extender circuit as in claim 1, wherein the distance is substantially zero.

4. An extender circuit as in claim 1, wherein:
   a first extender comprises the first handshake means and the first data means; and
   a second extender comprises the second handshake means and the second data means.

5. An extender circuit as in claim 1, wherein:
   a plurality of sources are coupled to the first sub-bus; and
   a plurality of acceptors are coupled to the second sub-bus.

6. An extender circuit as in claim 5, wherein:
   a first extender comprises the first handshake means and the first data means; and
   a second extender comprises the second handshake means and the second data means.

7. An extender circuit as in claim 6, wherein:
   the first extender is coupled to, and is operative for transferring the byte of data to and from the sources via the first sub-bus under an IEEE Standard 488-1978 protocol; and
   the second extender is coupled to, and is operative for transferring the byte of data to and from the acceptors via the second sub-bus under the IEEE Standard 488-1978 protocol.

8. A method for transmitting a byte of data across a distance between a first sub-bus and a second sub-bus, the method comprising the steps in order of:
   determining that the second sub-bus is ready for the byte of data;
   indicating to a second extender, a first extender and the first sub-bus that the second sub-bus is ready for the byte of data;
   determining that the byte of data is present on the first sub-bus;
   coupling the byte of data from the first sub-bus to the second extender;
   indicating to the second extender that the byte of data is coupled thereto;
   coupling the byte of data from the extender to the second sub-bus; and indicating to the second sub-bus that the byte of data is coupled thereto.

9. A method as in claim 8, wherein the step of determining that the second sub-bus is ready for the byte of data is performed by the second extender.

10. A method as in claim 9, wherein the steps of determining that the byte of data is present on the first sub-bus, coupling the byte of data from the first sub-bus to the second sub-bus and indicating to the second extender that the byte of data is coupled thereto are performed by the first extender.

11. A method as in claim 10, wherein:

a plurality of sources are coupled to the first sub-bus; and a plurality of acceptors are coupled to the second sub-bus.

12. A method as in claim 11, wherein the steps of determining that the second sub-bus is ready for the byte of data, indicating to a second extender that the second sub-bus is ready for the byte of data, determining that the byte of data is present on the first sub-bus and indicating to the second sub-bus that the byte of data is coupled thereto are performed in accordance with an IEEE Standard 488-1978.

* * * * *

UNITED STATES PATENT AND TRADEMARK OFFICE
CERTIFICATE OF CORRECTION

PATENT NO. : 4,451,886

DATED : May 29, 1984

INVENTOR(S) : David H. Guest and Peter R. Roubaud

It is certified that error appears in the above—identified patent and that said Letters Patent is hereby corrected as shown below:

On the title page:

In the Abstract, delete the first part of the first sentence "The present invention is related to bus" and instead insert -- Bus --

Column 1, line 11, after "versions" insert -- of --

Column 5, line 18, delete "looks"

Column 5, line 50, "communication of" should be changed to read -- communication. Of --

Column 9, line 15, after "are" insert -- in --.

Column 9, line 43, change "may not" to -- may be --

Column 9, line 44, "bioth" should read -- both --

Signed and Sealed this

Twenty-first Day of May 1985

[SEAL]

Attest:

DONALD J. QUIGG

Attesting Officer

Acting Commissioner of Patents and Trademarks